United States Patent [19]

Farrell et al.

[11] Patent Number: 5,245,368
[45] Date of Patent: Sep. 14, 1993

[54] METHOD AND APPARATUS OF UTILIZING STORED JOB INFORMATION IN AN ELECTRONIC REPROGRAPHIC PRINTING SYSTEM

[75] Inventors: Michael E. Farrell, Fairport; Josefina Moreno, Rochester; Pedro R. Ortiz, Webster; George W. Webster, Rochester; Darlene L. Hulse, Rochester; Renard A. Iannettone, Rochester; William M. OuYang, Pittsford; Carla J. Kinder, Ontario; John C. Austin, Rochester, all of N.Y.; Rita R. Edmunds, Galesville, Wis.

[73] Assignee: Xerox Corporation, Stamford, Conn.

[21] Appl. No.: 589,623

[22] Filed: Sep. 28, 1990

[51] Int. Cl.⁵ ............................................. G06F 11/30
[52] U.S. Cl. .................................... 358/401; 358/468; 355/205; 355/206; 355/207; 371/16.4; 371/16.5; 371/29.1; 371/7
[58] Field of Search ................................ 355/204–207, 355/314; 371/7, 16.4, 16.5, 29.1; 358/400, 401, 468, 403, 444

[56] References Cited

U.S. PATENT DOCUMENTS

| | | | |
|---|---|---|---|
| 4,229,100 | 10/1980 | Travis | 355/77 |
| 4,375,916 | 3/1983 | Levine | 355/40 |
| 4,443,849 | 4/1984 | Ohwada | 371/9 |
| 4,514,846 | 4/1985 | Federico et al. | 371/16.4 |
| 4,521,847 | 6/1985 | Ziehm et al. | 371/12 |
| 4,588,282 | 5/1986 | Levine | 358/300 |
| 4,627,710 | 12/1986 | Goetz | 355/314 |
| 4,665,520 | 5/1987 | Strom et al. | 371/7 |
| 4,693,590 | 9/1987 | Umeda | 355/313 |
| 4,697,266 | 9/1987 | Finley | 371/12 |
| 4,843,428 | 6/1989 | Sugiura et al. | 355/202 |
| 4,920,427 | 4/1990 | Hirata | 358/437 |
| 5,107,299 | 4/1992 | Farrell et al. | 355/207 |
| 5,130,806 | 7/1992 | Reed et al. | 358/468 |
| 5,148,286 | 9/1992 | Knodt et al. | 358/468 |

Primary Examiner—Edward L. Coles, Sr.
Assistant Examiner—Jill Jackson
Attorney, Agent, or Firm—Oliff & Berridge

[57] ABSTRACT

A method and apparatus for operating an electronic reprographic system providing for the storing of information in the system of the status of all jobs in the system, monitoring the system for faults, providing for crash recovery wherein communication between processing units of the system enables the system to recommence printing at the point at which a crash occurred, and allowing the system to tie a fault discovered in the system with a job containing a faulted feature so that the printing jobs may be completed sequentially up to a job requiring a faulted feature. Additionally, the system is capable of permitting a higher priority job to interrupt a currently printed job in order to be printed non-sequentially.

11 Claims, 13 Drawing Sheets

FIG. 7

METHOD AND APPARATUS OF UTILIZING STORED JOB INFORMATION IN AN ELECTRONIC REPROGRAPHIC PRINTING SYSTEM

BACKGROUND OF THE INVENTION

1. Field of the Invention

The present invention relates to electronic printers and printing systems, and more particularly, to a method of storing information regarding the status of all features of jobs in the printing system, and providing such stored information held within the printing system when necessary to recommence printing after crash recovery. The invention also relates to a method of permitting sequential completion of the jobs in a printing system up to a job requiring a faulted feature, and to the nonsequential completion of a job or jobs in the event of operator intervention.

2. Description of the Related Art

In electronic reprographic printing systems, a document or series of documents comprising at least one print job are successively scanned. Upon scanning of the documents, image signals are obtained and electronically stored as electronic pages. The signals are then read out successively and transferred to a printer for the formation of the images on paper. Once a document is scanned, it can be printed any number of times or processed in any number of ways (e.g., words deleted or added; image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner down-time.

Each job entered into the system is accompanied with its own unique set of job features, collectively called "sheet information", which is stored in a "job bank" A job may have from 1 to 250 job banks, because a new job bank is needed for every sheet which is different from the previous one (i.e., paper color, paper stock). For example, if a job has 200 sheets which alternate colors of paper every other sheet, the job will require 200 job banks. If a job has several originals, but only one type of paper is needed, the job will require 2 job banks: one for the start sheet and one for the end sheet. If a job has one original and 50 copies are needed, this job requires only one job bank. It is a function of the system's memory to hold this information regarding the features of the jobs it is requested to print until such job is completed. Job features include such things as size and type of paper, duplex vs. simplex, number of sets, destination of sets, whether the job is to be collated, stitched or bound, etc. Operation in an electronic reprographic system can be interrupted for a variety of reasons. The interruption can be the result of a scanner or printer fault, hardware or software faults, paper misfeed, intentional interruption, etc. Some faults may require immediate attention prior to the completion of any job; others may affect job features which may not be required for the completion of a specific job entered into the system. If a fault or combination of faults is sufficiently critical to interfere with the total functioning of the printing system, a crash occurs, requiring crash recovery. If the features of the jobs still active at the time of such crash are not kept within the system's memory, a crash will necessitate reentering all of the sheet information before the job can be completed.

The related art discloses printing systems which employ a system's memory for many diverse purposes. In the prior art, U.S. Pat. Nos. 4,375,916 and 4,588,282 to Levine disclose a photocopying machine having a detachable, portable optical reader capable of being carried about by a user for temporarily recording an image of a printed document to be copied or reproduced. This device also contains a visual display means of the transferred images, enabling the users to initially observe the images before hard copies are made.

U.S. Pat. No. 4,843,428 to Sugiura discloses a copying machine which enables a number of document images to be pre-stored in memory in such a manner that any one document image can be selected and copied.

U.S. Pat. No. 4,920,427 to Hirata discloses a facsimile apparatus wherein received image information is stored in an accumulator in case printing trouble is detected. Upon elimination of the printing trouble, the image information stored is read out and printed. This invention provides for a "holding" of such image information.

Methods of storing job information for the purpose of effecting crash recovery have also been described. U.S. Pat. No. 4,665,520 to Strom discloses a recovery system in a multiprocessor system wherein messages are used to track down a fault within the system. Each message is dependent on another message from another recovery unit to create an expected session sequence number. By comparing the actual session sequence number to the expected session sequence number, a fault can be thus detected.

U.S. Pat. No. 4,229,100 to Travis applies a recovery system wherein messages are built on one another to relay information regarding the number of copies actually processed so that they can be properly billed in the event of a jam.

U.S. Pat. No. 4,443,849 to Ohwada discloses an error recovery system for a multiprocessor system wherein a processor communicates status signals to another processor without using the main memory, and provides for a diagnostic system by reviewing the status signals.

U.S Pat. No. 4,521,847 to Ziehm discloses a control system for job recovery after a malfunction wherein important job characteristics are stored in a nonvolatile memory so that if a crash or jam occurs, all of the job information will be available for job recovery. Once job recovery is done, all of the job data will be reloaded into the appropriate location.

U.S. Pat. No. 4,697,266 to Finley discloses an asynchronous checkpointing system for error recovery for use with a database. An error recovery table is used by a program to constantly update the database during a program's operation to ensure that the status of the database is as current as possible. The error recovery tables are stored in memory when a fault or other problem occurs.

OBJECTS AND SUMMARY OF THE INVENTION

The aforementioned patents do not provide for the storage of detailed job information so that such information does not need to be retransmitted in the event of multiple copies or in the event of job interruption. Furthermore, none of the prior art allows the system to continue with the sequential completion of all jobs entered into the system not requiring features which are not faulted up to a job containing a faulted feature, nor do they permit the operator to interrupt the system's operation in order to insert a job to be completed nonsequentially. Such improvements significantly increase the efficiency of the system by permitting the maximum amount of work to be completed by the system prior to the need for operator intervention, and by permitting the system's sequence of jobs to be changed in accordance with priorities established by the operator.

Accordingly, one object of the present invention is to provide an electronic reprographic system which stores within the printer information of a job's features for any incomplete job which has been transmitted to the printer.

Another object of the present invention is to provide an electronic reprographic system which provides for the communication of job information between units within the system in order to permit the system to commence printing at the same point at which the system crashed.

Another object of the present invention is to provide an electronic reprographic system which permits the system to tie a faulted feature to the job using the feature, enabling the system to complete all jobs up to the job requiring a feature that is faulted.

It is a further object of the present invention to provide an electronic reprographic system wherein the sequential order of jobs entered into the system can be interrupted, so that an interrupting job may be completed and delivered prior to the jobs entered into the system earlier.

To achieve the foregoing and other objects, and to overcome the shortcomings discussed above, an electronic reprographic system for printing a job is provided which stores information regarding the specific features of each job entered into the system, provides information regarding faults which exist within the system, permits the system to communicate information regarding incomplete jobs between units in order to recommence printing after crash recovery at the point at which the crash occurred, and allows for both the sequential completion of all jobs up to a job which requires a feature which is faulted, as well as for the non-sequential completion of a job in the event of operator intervention establishing a higher priority job status for a job.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface (UI) touchscreen of the printing system shown in FIG. 1.

DETAILED DESCRIPTION OF THE PREFERRED EMBODIMENTS

A. The System

Figure 1:
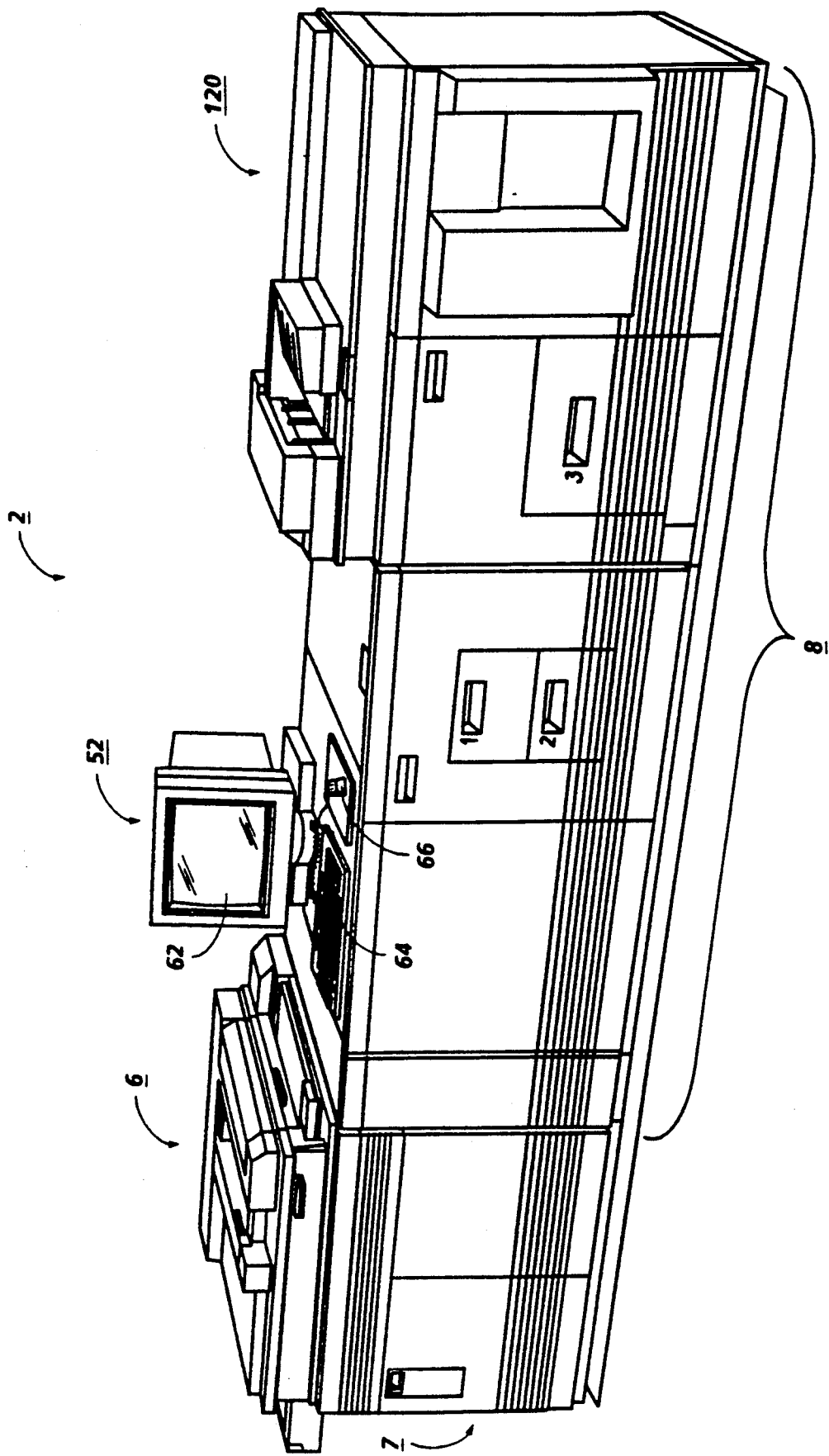
FIG. 1 is a view depicting an electronic printing system incorporating the print media identification system of the present invention.
Figure 2:
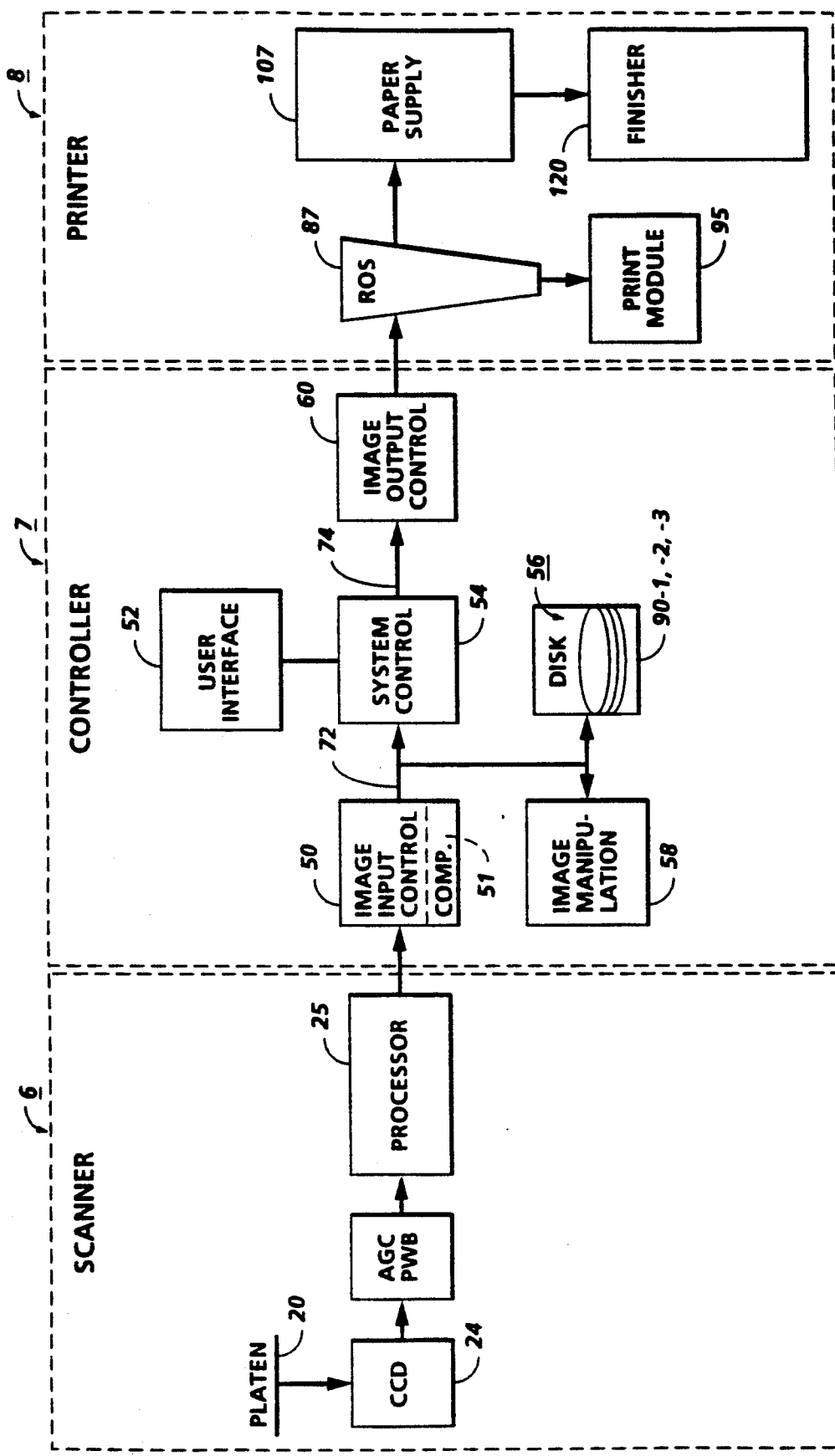
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
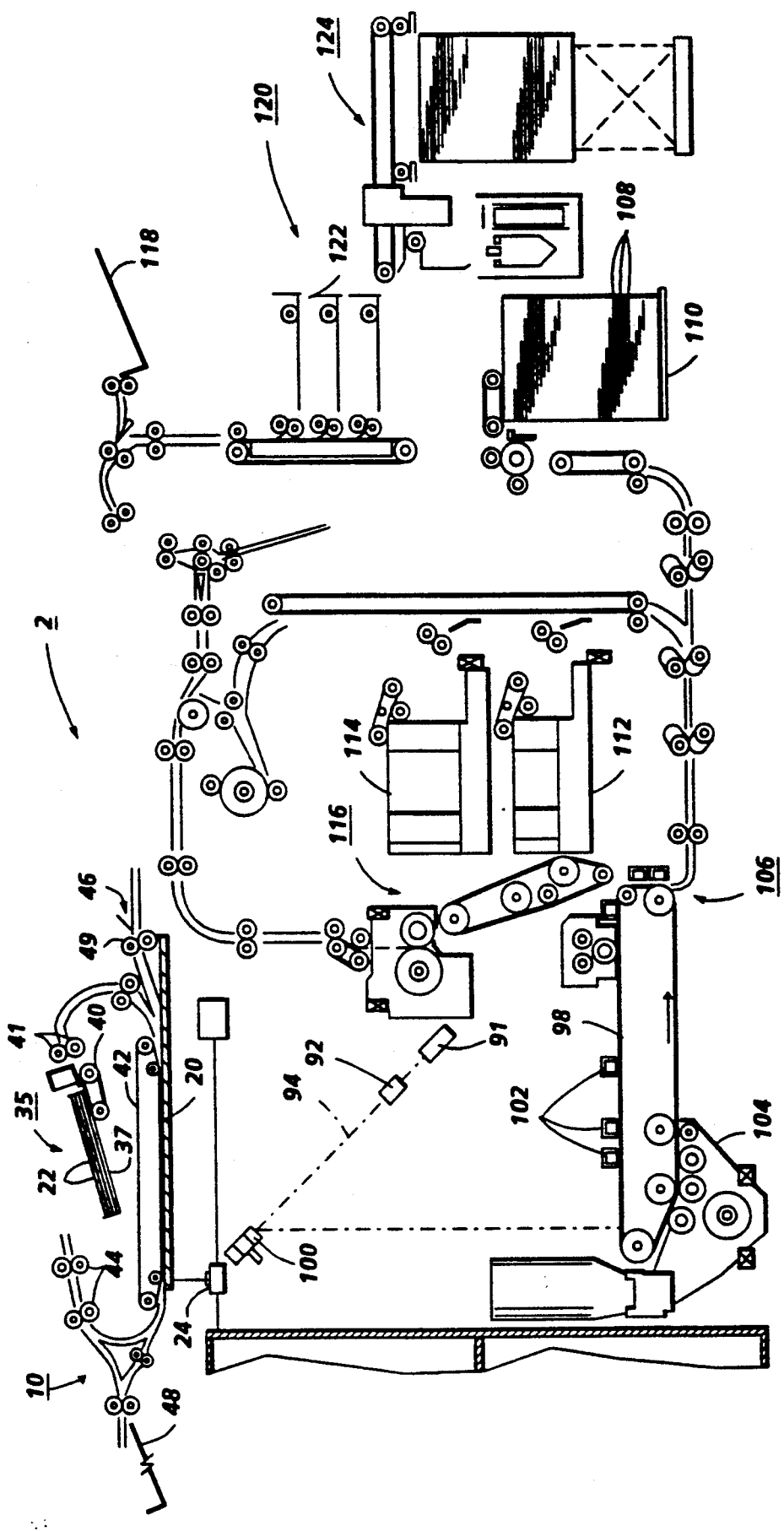
FIG. 3 is a plan view illustrating the principal mechanical components of the printing system shown in FIG. 1.
Figure 4:
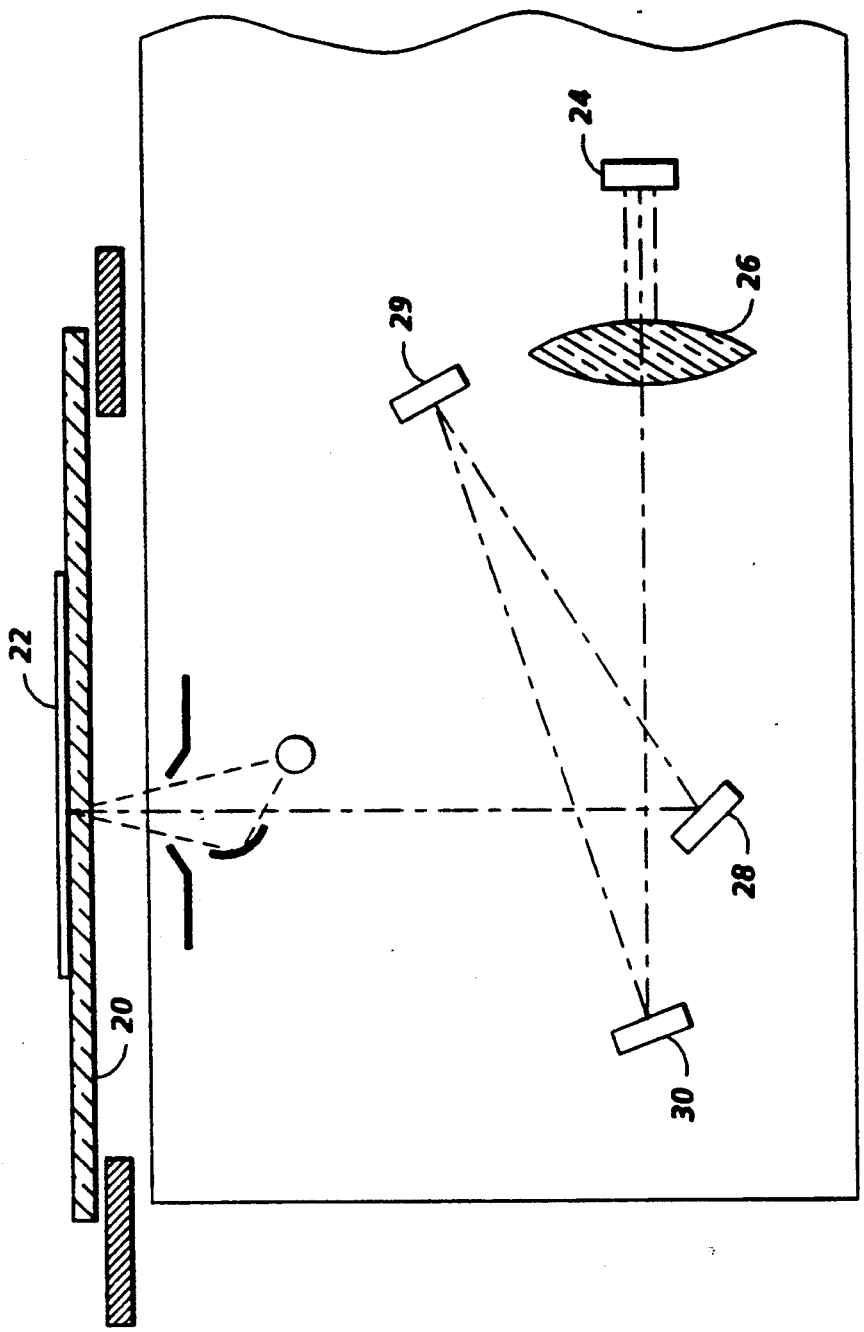
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary paper trays 112, or 1114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books. The printer 8 also preferably includes a nonvolatile memory (not shown) for storage of certain printer information transferred by image output control 60.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
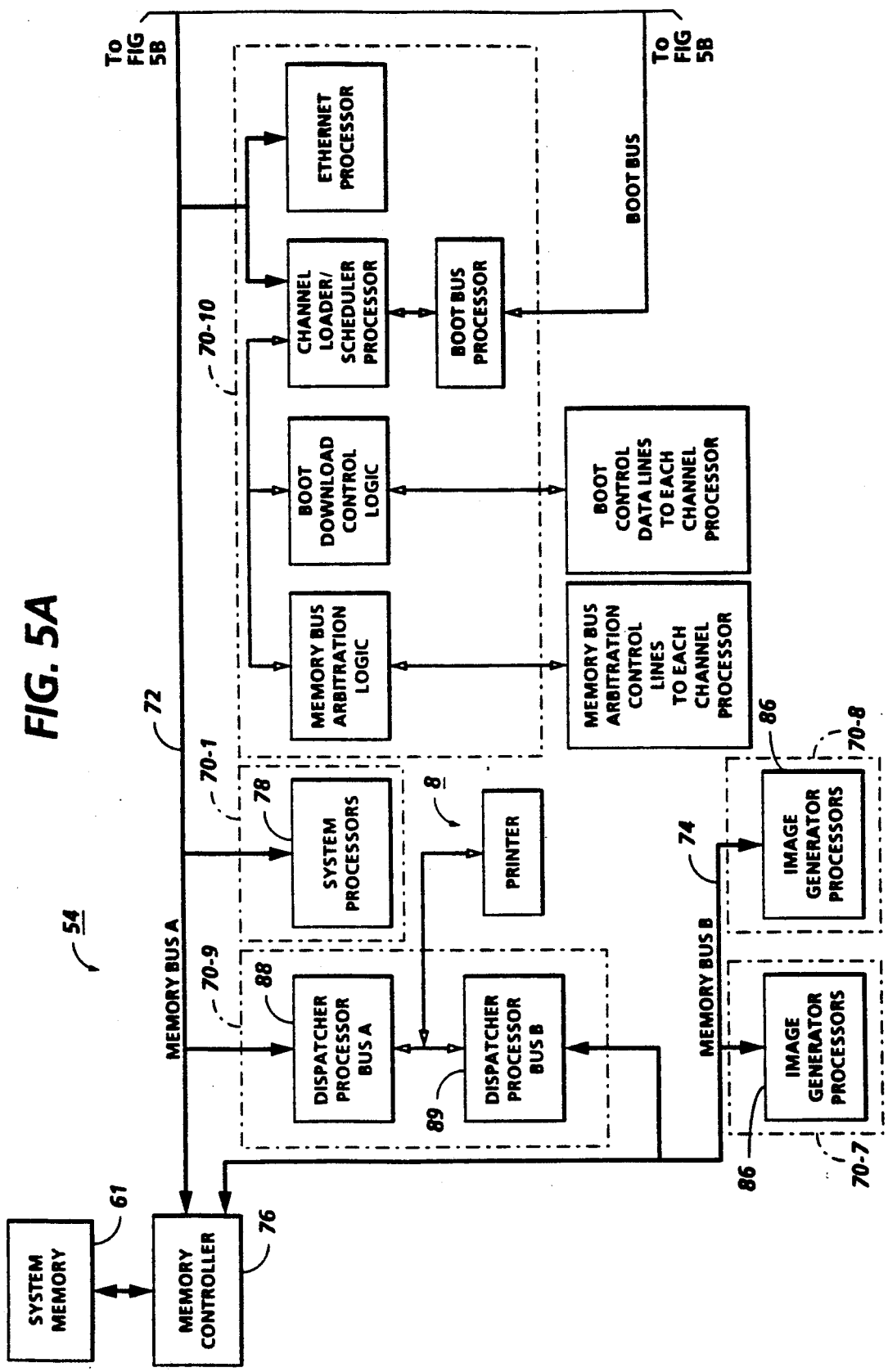
FIGS. 5A, 5B, and 5C comprise a schematic block diagram showing the major parts of the control section for the printing system shown in FIG. 1.
Figure 5B:
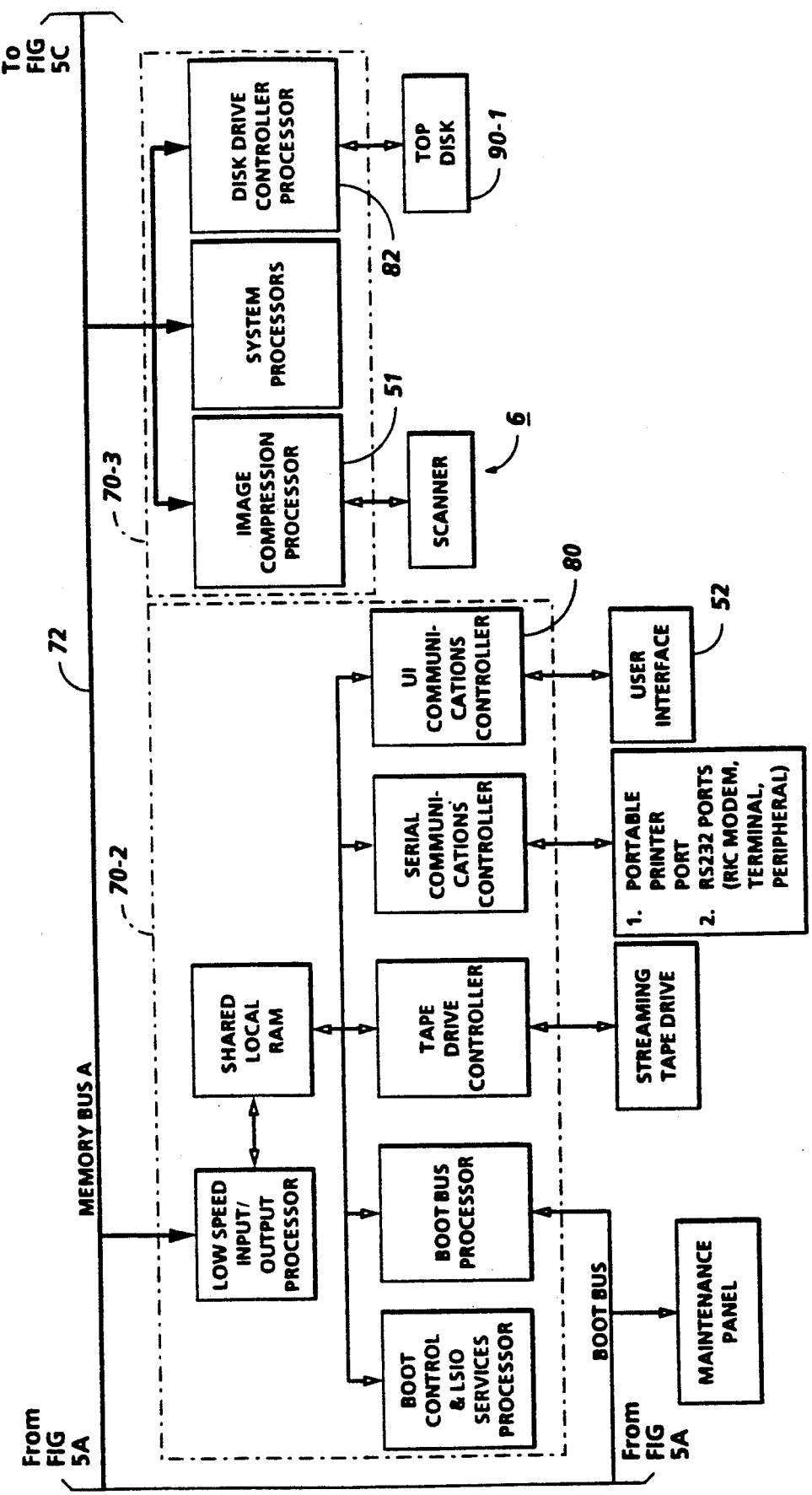
Figure 5C:
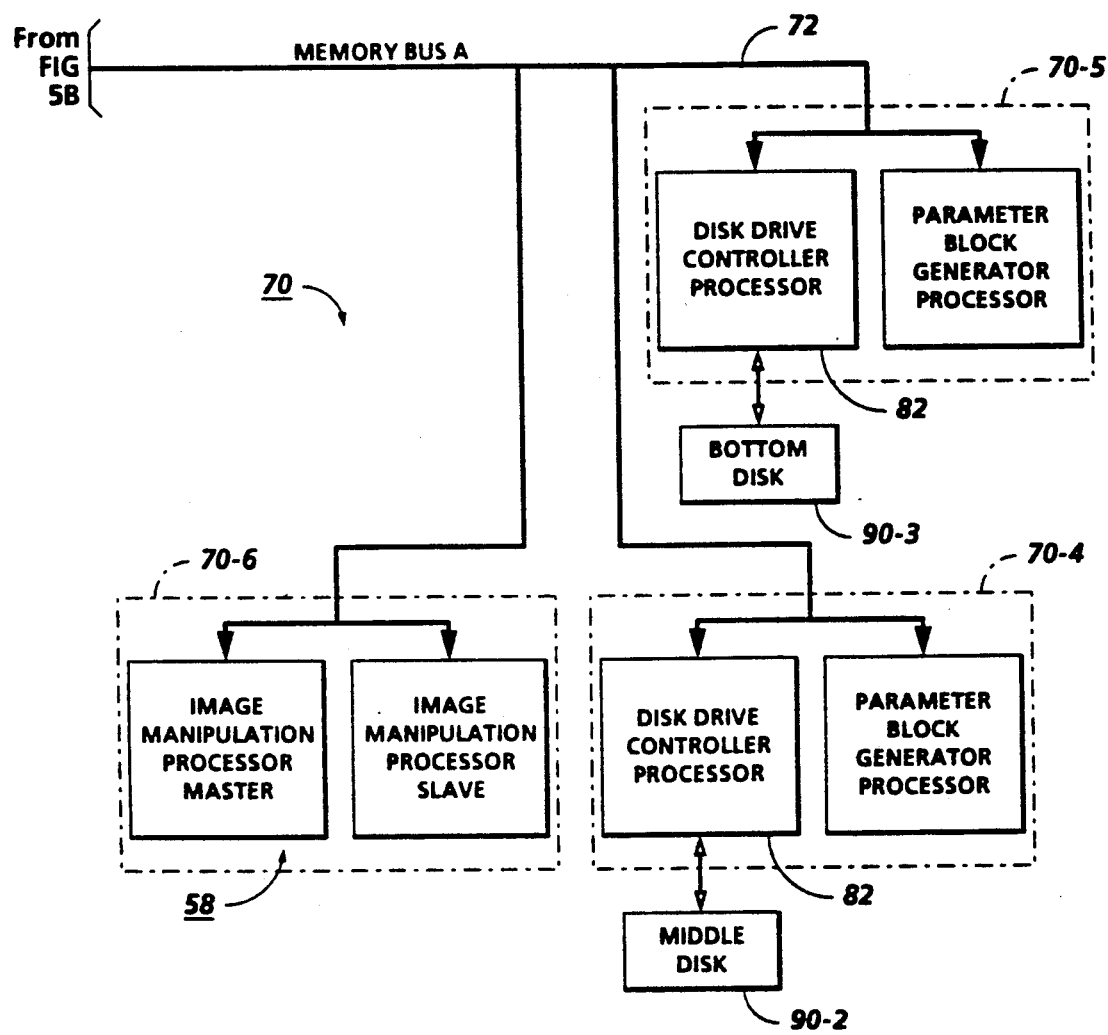

Referring particularly to FIGS. 5A-5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scan-lines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
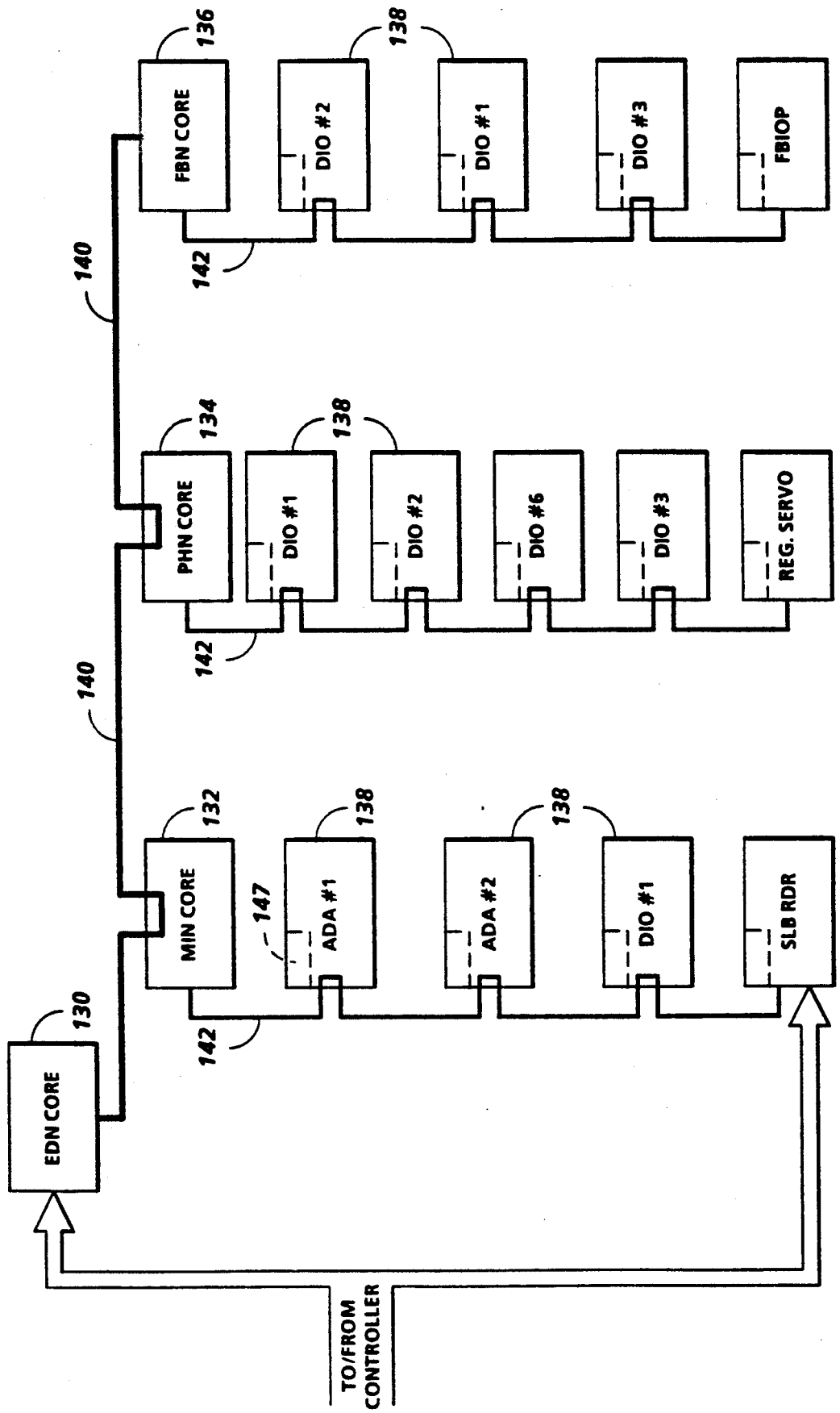
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated the core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
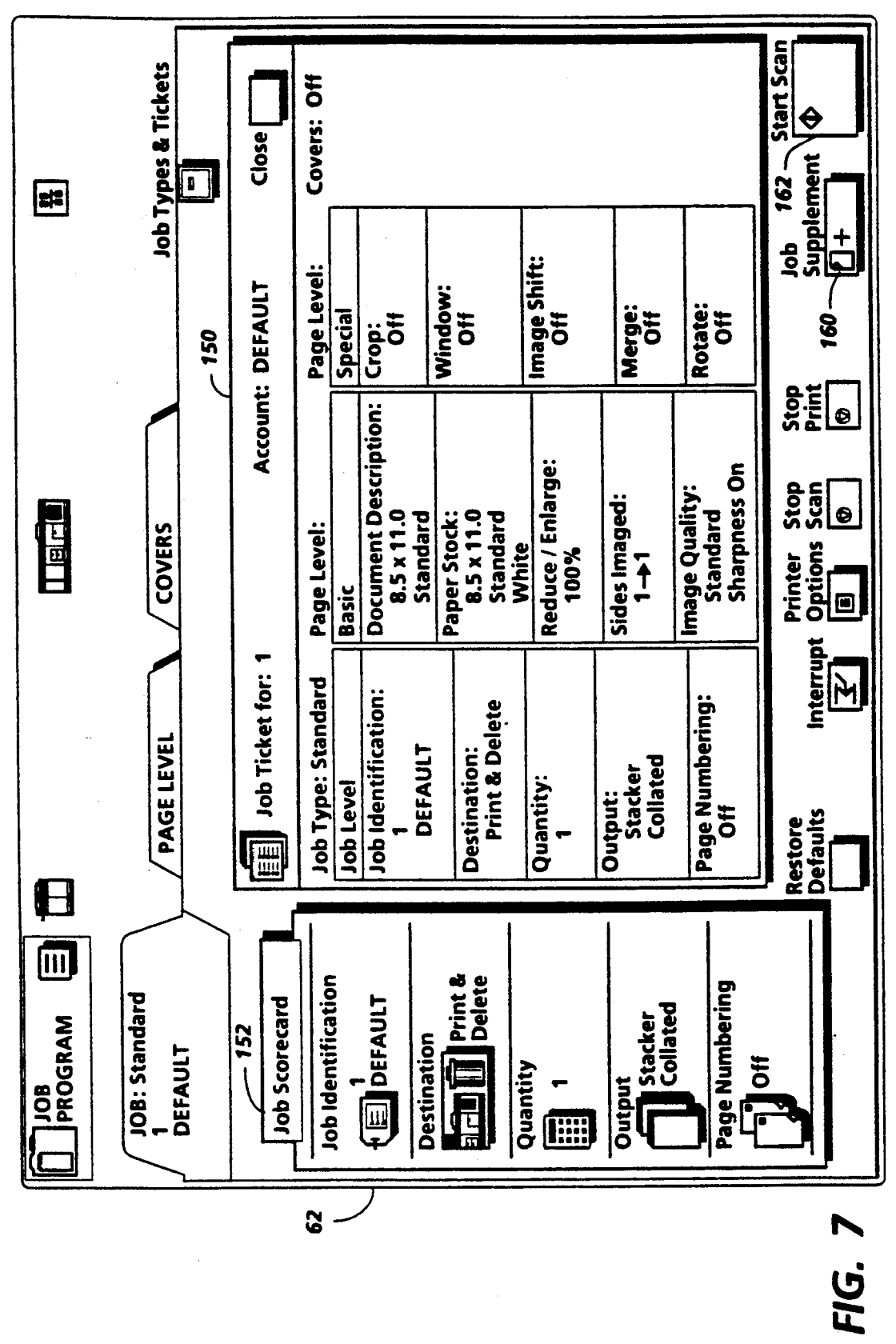

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Communication between Controller 7 and Printer 8

1. Job Print Information in Printer Memory

According to one aspect of the invention, the instructions for printer jobs from the image output controller are held locally in memory within the printer section 8, also known as Image Output Terminal, (IOT) for the period of time that the printer job is incomplete. An incomplete printer job is any job which has been transmitted to the printer, but which has not been completely delivered. By storing the sheet information in the IOT, the need for redundant transmission of sheet information when making multiple copies of a job is eliminated, as well as the need for retransmitting sheet information of a job interrupted by an interrupt job. The storage of printer information within the printer memory increases productivity and speed by obviating the need to repeatedly re-transmit job information to the printer. Additionally, printer storage of sheet information also enables the IOT to manage the selection of the set scheduling group for jobs with a quantity > 1, and to control job recovery for IOT declared faults.

Figure 8A:
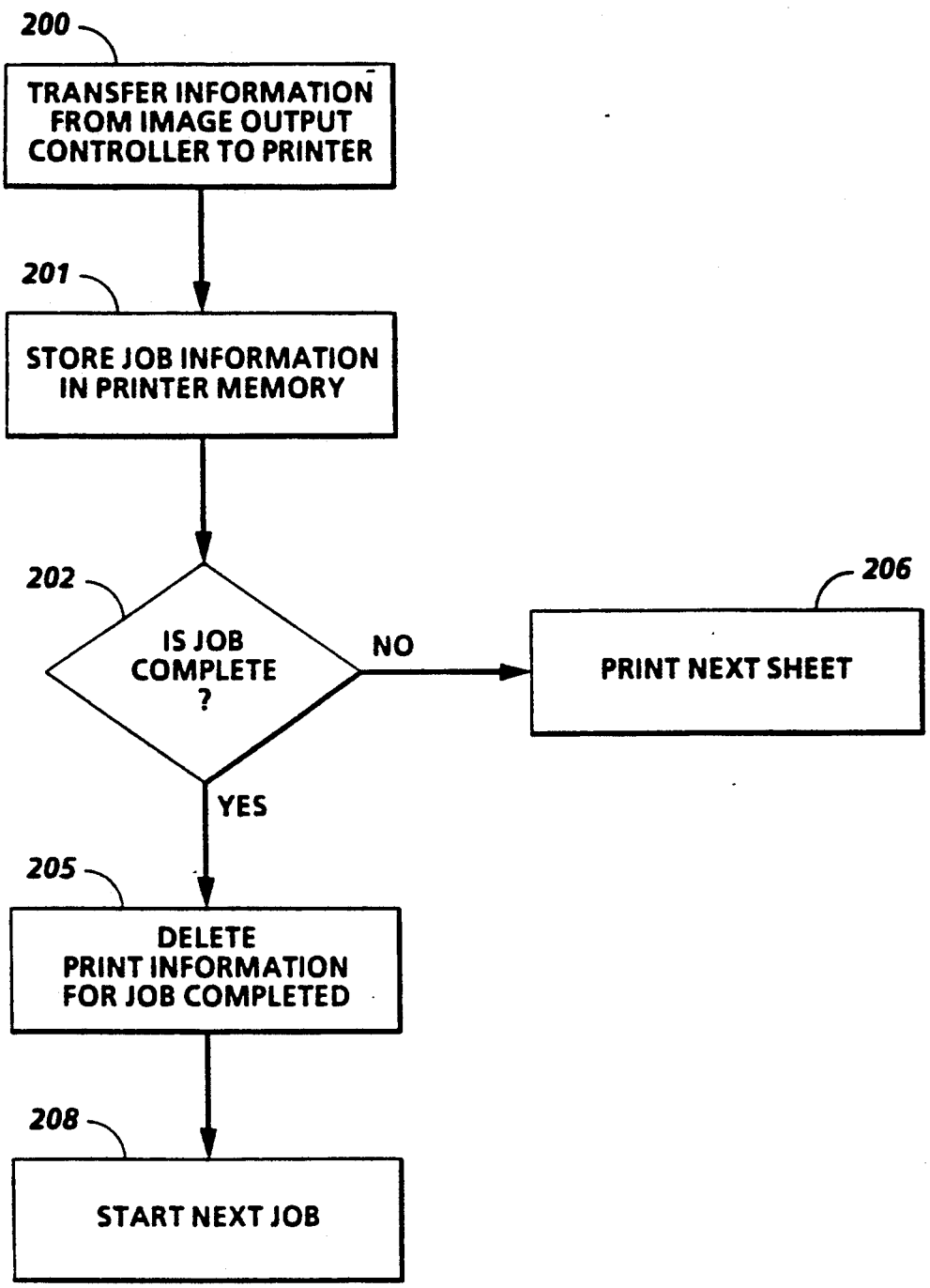
FIGS. 8A, 8B, 8C and 8D are flowcharts depicting the operation of the FIG. 1 system wherein the system stores job information and utilizes such stored information for the maximum completion of jobs within the system in the event of faults occurring within the system, or in the event of a job interrupting a sequence of jobs in the print queue.

FIG. 8A describes the process whereby the job information is transferred from the image output controller 60 to the printer 8 (Step 200) to be stored within the printer 8 for the period of time that the job is incomplete within the system 2 (Step 201). The system continually evaluates the state of completion of each job in the system (Step 202). If the job is completed, the job information is no longer needed for processing, and the information is deleted from the local memory within the printer (Step 204). If the job is not completed, then the information remains stored within the memory of the printer, and processing continues until the job is completed (Step 206). Upon completion, the printer goes on to the next incomplete job in the print queue (Step 208).

2. Fault Recovery

Another aspect of this invention is the communication ability between the controller 7 and printer 8 to synchronize themselves in order to recover jobs that were being processing during a fault or crash. Such communication occurs through the image output controller 60, PWB 70-9 with dispatch processors 88,89 for data transmission to and from printer (IOT) 8, and the memory in the printer 8.

A fault or crash is an unpredictable condition in any part of the system 2 which causes a subset of the system elements to become unavailable to the operator. Some examples are:

At the system level: Where a reboot (restart of the system after a crash which could be initiated by the system or through an operator intervention at UI 52) or a repowering (initiated by an operator only, but could include a loss of power) occurs.

At the system element level: Where the system attempts to recover automatically by reinitializing or resoftloading the system element. Additionally, during certain fault recovery procedures, the operator may cause the system to reinitialize or resoftload the system elements to achieve recovery.

At the hardware level (i.e., where hardware in the system becomes inoperative).

The present invention includes a crash recovery operation which will return the system elements to a functional state after a crash has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order.

Categories of crashes which occur in system 2 include:

1) those that the operator can perceive, but are automatically recoverable;
2) those which cause the system to automatically recover to a certain level, but which also require the operator to assist in order to finish recovery; and
3) those in which the system cannot automatically recover, and which require the operator to initiate the process of recovery (e.g., booting, cycling power).

To recover from a crash, in one form of this invention, the IOT 8 provides a message to the system control 54 called an "Advanced Video Hint" which indicates to the system control 54 what job/sheet/copy the IOT would hint for if it were requested to cycle up at that time. With this information, it is possible for the system control 54 to determine the status and the features for the job for which the IOT hinted.

Figure 8B:
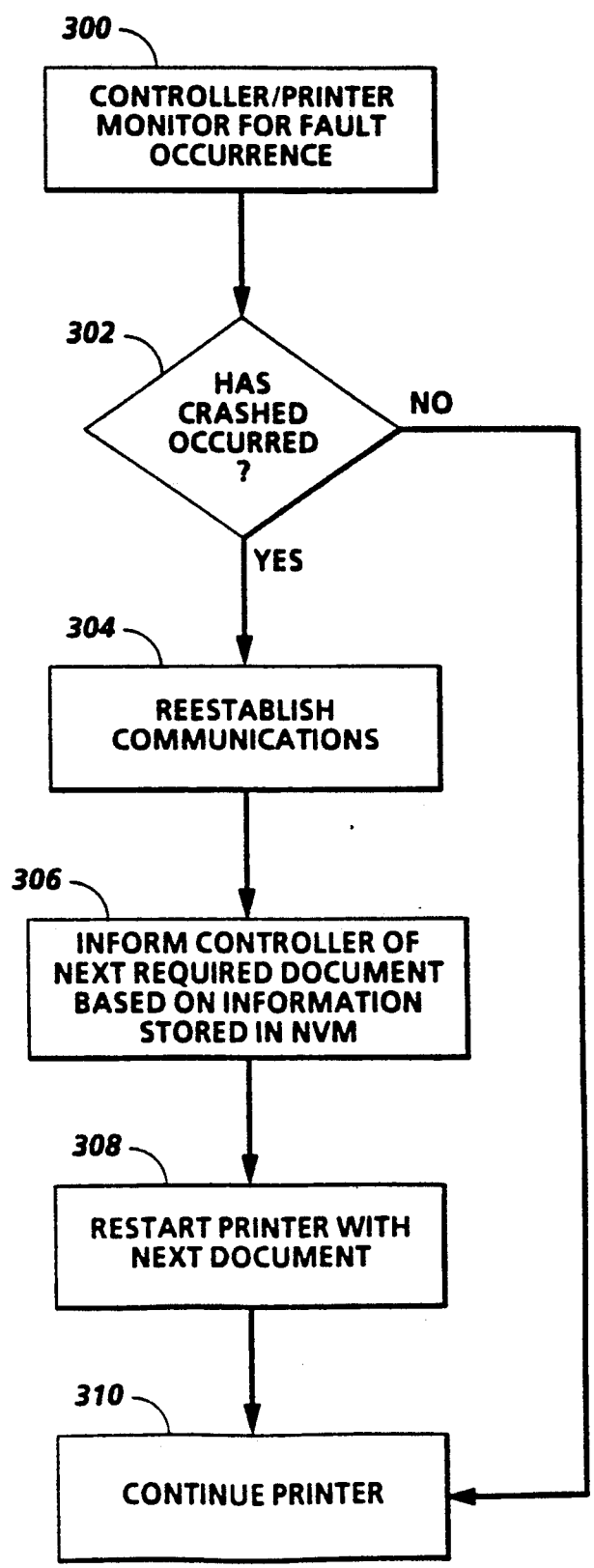

FIG. 8B describes the process wherein the printer communicates with the controller in order to provide the controller with information regarding the status of the system after a crash. Both components of the system monitor the system for faults (Step 300). In the event that a crash is detected (Step 302), the printer interrupts its processing and the system is provided with the necessary procedures for clearing the fault (Step 304) in order to reestablish communications between the printer and the controller. The printer provides the controller with information regarding the last document printed before the printer was interrupted (Step 306). The controller is thereby synchronized with the printer, and the printer restarts processing the last document it was printing before the job interrupt (Step 308). In the event that no fault is discovered in this monitoring process, the printer continues processing the jobs in the print queue (Step 310).

3. Operation with a Faulted Job

With the capability of such internal communication within the system, it is possible for the IOT to associate a faulted feature to the job using the feature, thus permitting the IOT to finish all jobs up to the job which requires a feature that is faulted, and then permitting the system to cycle down at a job boundary. Formerly, the IOT would cycle down immediately in the event of a fault and not complete the jobs within the system that did not require the faulted feature. For example, if there was a top tray job printing and the IOT received a finisher job, but there was a fault in the finisher, the IOT would cycle down immediately and not complete either job. If a job was printing that required tray 1 and the IOT received a job which required tray 2, if tray 2 was then lowered, the machine would cycle down immediately and not complete either job. If there was a top tray job printing and the IOT received a bind job, but the binder was cold, the IOT would cycle down immediately and not complete either job.

Figure 8C:
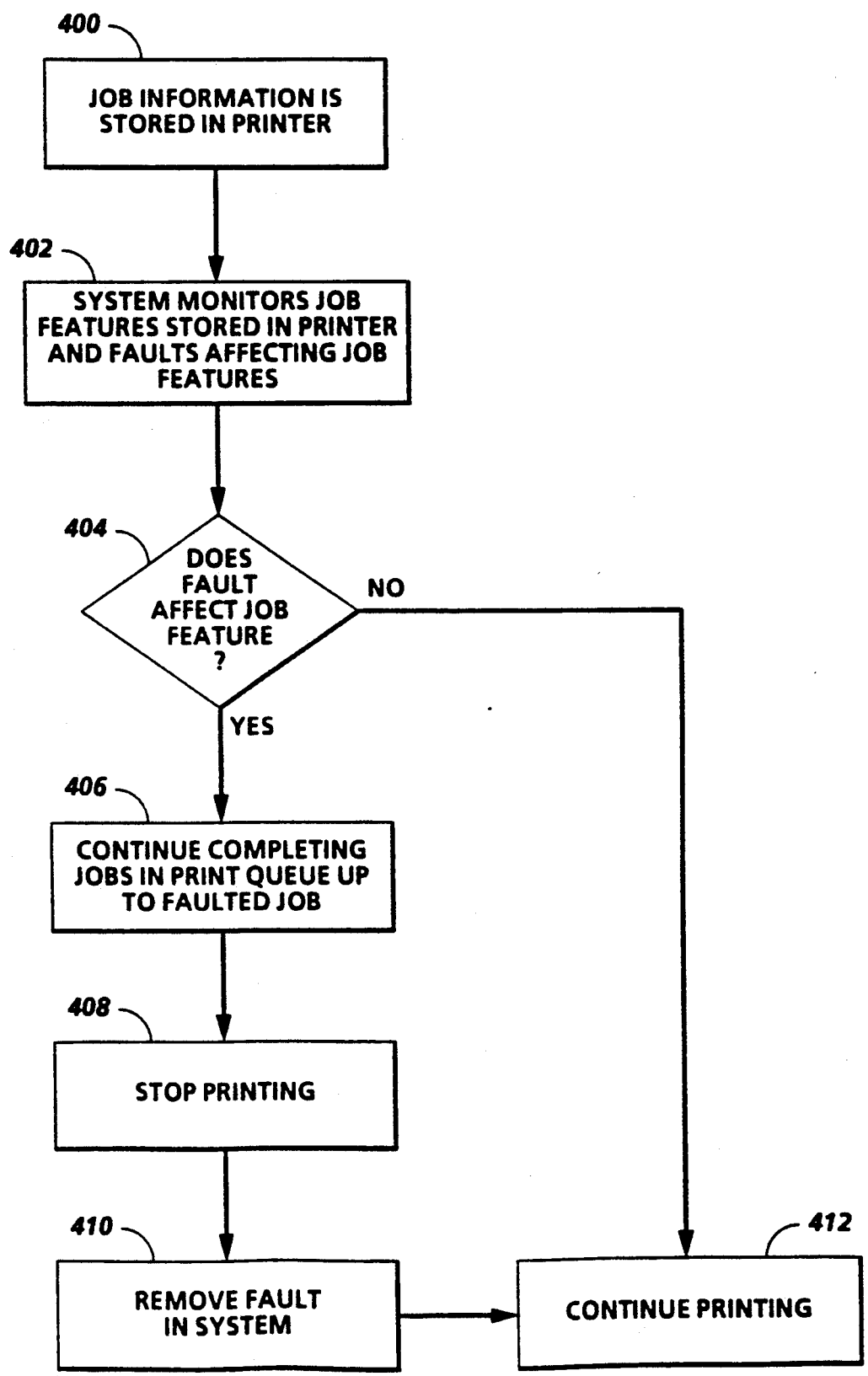

FIG. 8C describes the process wherein the system associates a fault which occurs in the system with the job features stored in the printer. All job information is stored locally in the printer during the period of time that the job is incomplete within the system (Step 400). The system continually monitors for job features stored in the printer and faults affecting the job features (Step 402). When a fault occurs, the system processes each job and its features, and evaluates whether the job is affected by the fault (Step 404). If not, the job remains in the print queue and printing continues (Step 412). If a job is affected by the fault, the system continues printing all jobs in the print queue until it reaches the job which has a feature affected by the fault (Step 406). At this time, the printer stops printing (Step 408) and remains inoperative until the fault is corrected within the system (Step 410). At this time, printing continues with the jobs remaining in the print queue (Step 412).

4. Order of Job Processing in the Printer

The IOT also has the ability to dynamically process and deliver non-sequential jobs without cycling down. This includes the ability to interrupt jobs currently printing when a high priority job is entered into the system by the operator. The interrupting job proceeds immediately, so that the jobs are no longer processed sequentially. The interrupting job is also delivered before the interrupted job, so that the jobs are not delivered sequentially. In addition, the IOT has the ability to deliver jobs to three different destinations at the same time. For example, if a finisher job is currently printing and the IOT receives a top tray job, the IOT can deliver the top tray job at the same time as the finisher job and it is possible for the top tray job to be fully delivered before the finisher job. Another example is where, while printing a finisher job, a higher priority top tray job can interrupt the finisher job. The top tray job will immediately be fully processed and delivered and then the IOT will resume the completion of the finisher job. A further example is where, while printing a bind job and the IOT receives a short top tray job, the IOT will finish delivering the top tray job before the bind job.

Figure 8D:
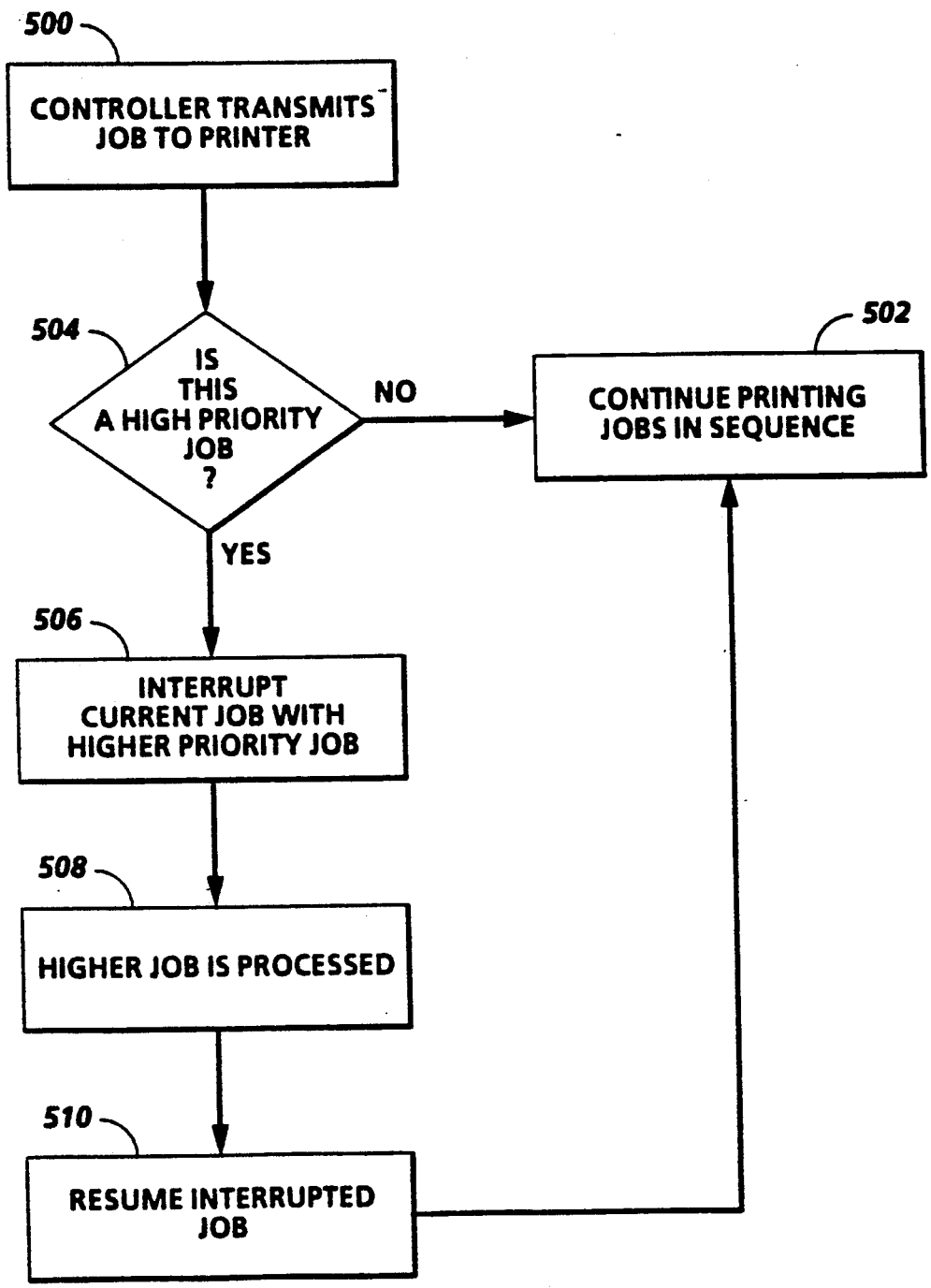

FIG. 8D describes the process whereby the job information is stored within the printer (Step 500). The stored jobs are completed in the sequential order in which the information is transmitted into the printer (Step 502) unless otherwise directed. If the operator provides the printer with job information of a higher priority job (Step 504), the printer immediately ceases operation on the sequentially ordered jobs, (Step 506) and the higher priority job is processed to completion (Step 508). Once the higher priority job is completed, the remaining jobs in the print queue are completed in the original sequential order (Step 510).

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of operating an electronic reprographic system capable of processing a plurality of jobs to be printed, wherein each job comprises a set of original documents, the method comprising the steps of:
   scanning each set of original documents to be printed;
   storing images of the scanned documents in memory, thereby forming a printer queue of all jobs to be printed;
   storing information in the system regarding print features of all jobs entered into the system;
   printing of said jobs in accordance with the print features stored in the system;
   monitoring the system for detection of a faulted feature for a job in said printer queue; and
   completing printing of all jobs in the printer queue not requiring the faulted feature up to the job requiring the faulted feature.

2. The method of claim 1, wherein said storing step includes storing the information in at least one job bank, said at least one job bank containing all features for one set of said job.

3. The method of claim 2, wherein only one set of said job features is required for a job requiring multiple copies.

4. A method of operating an electronic reprographic system capable of processing a plurality of jobs to be printed, wherein each job comprises a set of original documents, the method comprising the steps of:
   scanning each set of original documents to be printed;
   storing images of the scanned documents in memory in a controller component;
   converting the images to electronic pages for printing in a printing component;
   storing information in the printing component of the system regarding print features of all jobs entered into the system;
   monitoring the system for the detection of a crash in said system;
   providing for a series of crash recovery messages from the printing component to the controller component of said system.

5. The method of claim 4, wherein said crash recovery messages includes information regarding the features of a job or jobs which were being processed in the system at the time of the crash.

6. The method of claim 4, wherein said crash recovery messages indicate whether the jobs entered into the system were completed.

7. A method of operating an electronic reprographic system capable of processing a plurality of jobs to be printed, wherein each job comprises a set of original documents, the method comprising the steps of:
   scanning each set of original documents to be printed;

storing images of the scanned documents in memory, thereby forming a printing queue of all jobs to be printed;

storing information in the system regarding print features of all jobs entered into the system;

storing information regarding faulted print features which have occurred in the system;

associating a faulted print feature to a job in said printer queue requiring said faulted print feature; and completing all jobs not requiring said faulted print feature up to a job requiring said faulted print feature.

8. An apparatus for operating an electronic reprographic system capable of processing a plurality of jobs to be printed, wherein each job comprises a set of original documents, the apparatus comprising:

means for scanning each set of original documents to be printed;

means for storing images of the scanned documents in memory, thereby forming a printer queue of all jobs to be printed;

means for storing information in the system regarding print features of all jobs entered into the system;

means for printing of said jobs in accordance with the print features stored in the system;

means for monitoring the system for detection of a faulted feature of a job in said printer queue; and means for completing printing of all jobs in the printer queue not requiring the faulted feature up to the job requiring the faulted feature.

9. The apparatus of claim 8, wherein the means for storing information in the system is stored in at least one job bank, wherein said at least one job bank contains all features for said job.

10. An apparatus for operating an electronic reprographic system capable of processing a plurality of jobs to be printed, wherein each job comprises a set of original documents, the apparatus comprising:

means for scanning each set of original documents to be printed;

means for storing images of the scanned documents in memory in a controller component;

means for converting the images to electronic pages for printing in a printing component;

means for storing information in the printing component of the system regarding print features of all jobs entered into the system;

means for monitoring the system for the detection of a crash in said system;

means for providing for a series of crash recovery messages from the printing component to the controller component of said system.

11. An apparatus for operating an electronic reprographic system capable of processing a plurality of jobs to be printed, wherein each job comprises a set of original documents, the apparatus comprising:

means for scanning each set of original documents to be printed;

means for storing images of the scanned documents in memory, thereby forming a printer queue of all jobs to be printed;

means for storing information in the system regarding print features of all jobs entered into the system;

means for storing information regarding faulted print features which have occurred in the system;

means for associating a faulted print feature to a job in said printer queue requiring said faulted print feature;

means for completing all jobs not requiring said faulted print feature up to a job requiring said faulted print feature.

* * * * *